United States Patent
Sai

(10) Patent No.: US 12,113,604 B2
(45) Date of Patent: Oct. 8, 2024

(54) SYSTEM, CONTROL APPARATUS, COMPUTER READABLE STORAGE MEDIUM, AND CONTROL METHOD

(71) Applicant: SOFTBANK CORP., Tokyo (JP)

(72) Inventor: Jutatsu Sai, Kanagawa (JP)

(73) Assignee: SoftBank Corp., Tokyo (JP)

( * ) Notice: Subject to any disclaimer, the term of this patent is extended or adjusted under 35 U.S.C. 154(b) by 373 days.

(21) Appl. No.: 17/713,242

(22) Filed: Apr. 5, 2022

(65) Prior Publication Data

US 2022/0231755 A1    Jul. 21, 2022

Related U.S. Application Data

(63) Continuation of application No. PCT/JP2020/031474, filed on Aug. 20, 2020.

(30) Foreign Application Priority Data

Nov. 13, 2019  (JP) .................................. 2019-205783

(51) Int. Cl.
*H04B 7/185* (2006.01)
*B64C 39/02* (2023.01)
(Continued)

(52) U.S. Cl.
CPC ....... *H04B 7/18506* (2013.01); *B64C 39/024* (2013.01); *G05D 1/104* (2013.01);
(Continued)

(58) Field of Classification Search
CPC ... H04B 7/18506; H04B 17/318; H04W 4/40; H04W 16/28; H04W 72/542; H04W 84/06; B64C 39/024; G05D 1/104
See application file for complete search history.

(56) References Cited

U.S. PATENT DOCUMENTS

| | | |
|---|---|---|
| 2004/0166853 A1 | 8/2004 | Takeda |
| 2015/0334768 A1 | 11/2015 | Ranasinghe |
| | (Continued) | |

FOREIGN PATENT DOCUMENTS

| | | |
|---|---|---|
| JP | 2017521974 A | 8/2017 |
| JP | 2017169093 A | 9/2017 |
| | (Continued) | |

OTHER PUBLICATIONS (ISA/237) Written Opinion of the International Search Authority for International Patent Application No. PCT/JP2020/031474, issued/mailed by the Japan Patent Office on Oct. 13, 2020.
(Continued)

*Primary Examiner* — Raymond S Dean

(57) ABSTRACT

A system having flying objects, each of which includes: a beacon signal transmission unit for wirelessly transmitting a beacon signal including rank information representing the flying object is at, a first rank when wirelessly connected with a gateway, a second rank when wirelessly connected with a flying object at the first rank, and a third rank when wirelessly connected with a flying object at the second rank; a flying object identification unit for identifying, when wirelessly connected with any flying object among the flying objects, flying objects from which strength of a radio wave received is stronger than threshold; and a flying object determination unit for determining a flying object with which wireless connection is to be performed, from the identified flying objects and based on the strength of radio wave received from each of the flying objects and a rank of the each of the flying objects, is provided.

20 Claims, 13 Drawing Sheets

(51) Int. Cl.
  *G05D 1/00*    (2006.01)
  *H04B 17/318*  (2015.01)
  *H04W 4/40*    (2018.01)
  *H04W 16/28*   (2009.01)
  *H04W 72/542*  (2023.01)
  *H04W 84/06*   (2009.01)
  *B64U 10/13*   (2023.01)
  *B64U 101/20*  (2023.01)

(52) U.S. Cl.
  CPC ............ *H04B 17/318* (2015.01); *H04W 4/40* (2018.02); *H04W 16/28* (2013.01); *H04W 72/542* (2023.01); *H04W 84/06* (2013.01); *B64U 10/13* (2023.01); *B64U 2101/20* (2023.01); *B64U 2201/10* (2023.01)

(56)         References Cited

U.S. PATENT DOCUMENTS

| | | |
|---|---|---|
| 2016/0316361 A1 | 10/2016 | Bhargava |
| 2019/0086938 A1 | 3/2019  | Shattil |
| 2020/0380874 A1 | 12/2020 | Fujii |
| 2021/0050910 A1 | 2/2021  | Matsuura |

FOREIGN PATENT DOCUMENTS

| | | | |
|---|---|---|---|
| JP | 2019135823 A | | 8/2019 |
| JP | 2019140427 A | | 8/2019 |
| KR | 20130128144 A | | 11/2013 |

OTHER PUBLICATIONS

Extended European Search Report for counterpart European Application No. 20886858.8, issued by the European Patent Office on Dec. 11, 2023.

SYSTEM, CONTROL APPARATUS, COMPUTER READABLE STORAGE MEDIUM, AND CONTROL METHOD

The contents of the following Japanese patent application(s) are incorporated herein by reference:
NO. 2019-205783 filed in JP on Nov. 13, 2019
NO. PCT/JP2020/031474 filed in WO on Aug. 20, 2020

BACKGROUND

1. Technical Field

The present invention relates to a system, a control apparatus, a computer readable storage medium, and a control method.

2. Related Art

HAPS (High Altitude Platform Station) has been known for providing a terminal with wireless communication service by establishing a feeder link with a gateway on the ground, establishing a service link with a terminal on the ground, and relaying communication between the gateway and the terminal (for example, refer to Patent Document 1).

PRIOR ART DOCUMENT

Patent Document

Patent Document 1: Japanese Patent Application Publication No. 2019-135823

Technical Problem

It is desirable that the service can be provided without installing a gateway on the ground for each HAPS.

DESCRIPTION OF EXEMPLARY EMBODIMENTS

Hereinafter, (some) embodiment(s) of the present invention will be described. The embodiment(s) do(es) not limit the invention according to the claims. Moreover, some combinations of features described in the embodiments may be unnecessary for a solution of the invention.

Figure 1:
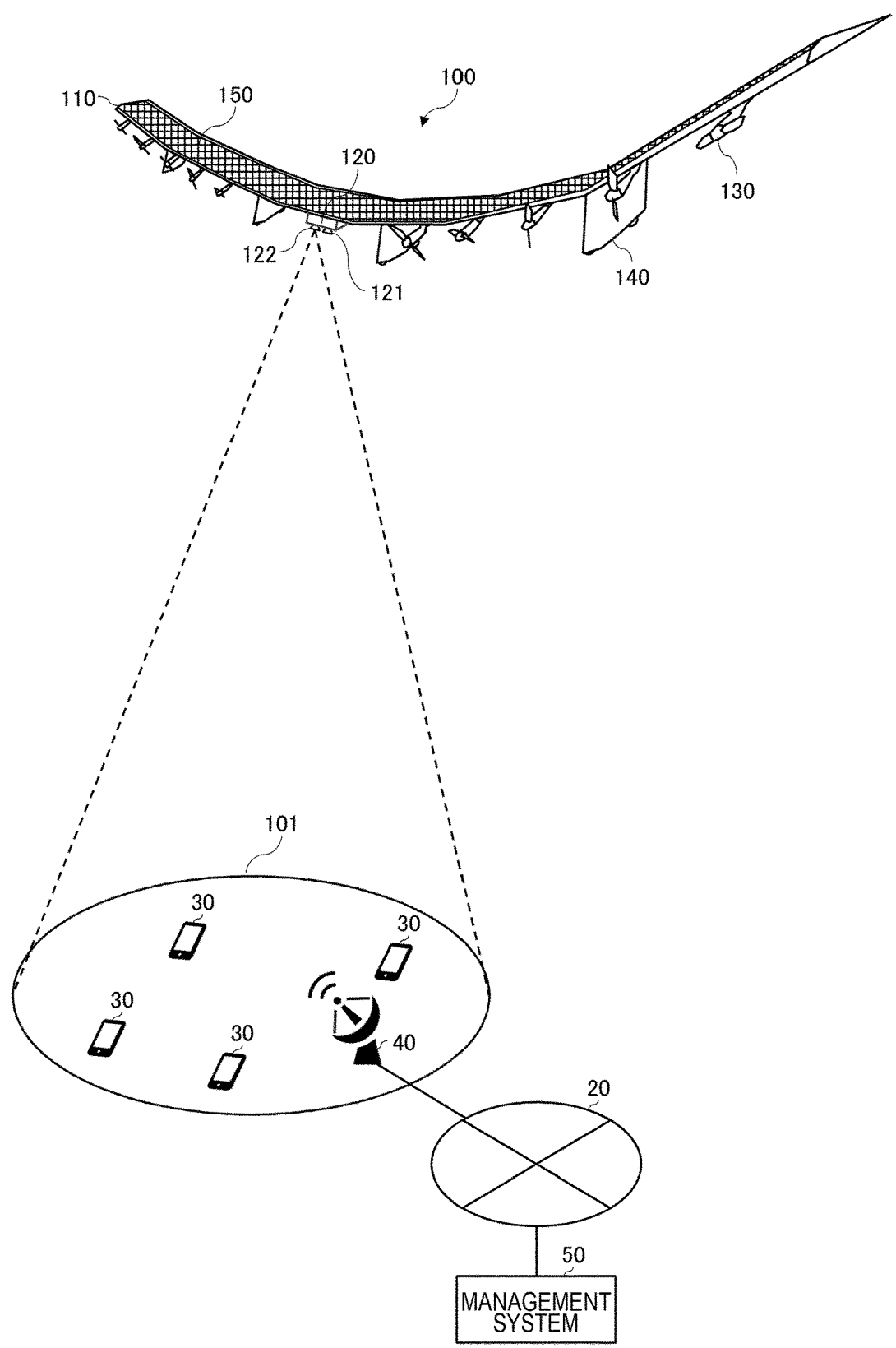
FIG. 1 schematically shows one example of a HAPS 100.

FIG. 1 schematically shows one example of a HAPS 100. The HAPS 100 may be one example of a flying object having a relaying function for relaying communication between a gateway 40 on the ground, and a user terminal 30 within a cell 101 formed by wirelessly connecting with the gateway 40 and irradiating a beam toward the ground.

The HAPS 100 includes a fuselage 110, a central part 120, a propeller 130, a pod 140, and a solar panel 150. A control apparatus 200, which is not shown in the diagram, is arranged within the central part 120.

The solar panel 150 generates power which is then stored in one or more batteries arranged in at least any of the fuselage 110, the central part 120, and the pod 140. The power stored in the battery is used by each configuration in the HAPS 100.

The control apparatus 200 controls a flight and communication of the HAPS 100. The control apparatus 200 controls the flight of the HAPS 100 by controlling rotation of the propeller 130, for example. Also, the control apparatus 200 may control the flight of the HAPS 100 by changing an angle of a flap or an elevator, which are not shown in the diagram. The control apparatus 200 may include various types of sensors including a position measuring sensor such as a GPS sensor, a gyro sensor, and an acceleration sensor etc., and manage a position, a moving direction, and a moving speed of the HAPS 100.

The control apparatus 200 forms a feeder link with a gateway 40 on the ground by using a FL (Feeder Link) antenna 121. The control apparatus 200 may access a network 20 via the gateway 40.

The control apparatus 200 forms the cell 101 on the ground by using a SL antenna 122. The control apparatus 200 forms a service link with a user terminal 30 on the ground by using the SL antenna 122. The SL antenna 122 may be an antenna having a directivity lower than that of the FL antenna 121. The SL antenna 122 may be a multi-beam antenna. The cell 101 may be a multi-cell.

The user terminal 30 may be any type of communication terminal that is communicable with the HAPS 100. For example, the user terminal 30 is a cellular phone such as a smartphone. The user terminal 30 may also be a tablet terminal, a PC (Personal Computer), and the like. The user terminal 30 may also be, so-called an IoT (Internet of Thing) device. The user terminal 30 can include anything that belongs to, so-called IoE (Internet of Everything).

The HAPS 100 relays communication between the gateway 40 and the user terminal 30 via the feeder link and the service link, for example. The HAPS 100 may provide the user terminal 30 with a wireless communication service by relaying the communication between the user terminal 30 and the network 20. The network 20 includes a mobile communication network. The mobile communication network may comply with any of 3G (3rd Generation) communication standard, LTE (Long Term Evolution) communication standard, 5G (5th Generation) communication standard, and a communication standard for 6G (6th Generation) or later. The network 20 may include the Internet.

The HAPS 100 transmits data received from the user terminal 30 within the cell 101 to the network 20, for example. Also, the HAPS 100 transmits this data to the user terminal 30 when data for the user terminal 30 within the cell 101 has been received via the network 20, for example.

The HAPS 100 may be managed by a management system 50. The HAPS 100 operates according to an instruction transmitted by the management system 50 via the network 20 and the gateway 40, for example.

The management system 50 controls a flying object 100 by transmitting the instruction. The management system 50 may cause the HAPS 100 to circulate in the sky over a target area so that the target area on the ground is covered by the cell 101. In some cases, a fixed-point flight refers to the HAPS 100 circulating in the sky in the target area in order to cover the target area. For example, while the HAPS 100 flies in a circular orbit in the sky above the target area, the HAPS 100 maintains a feeder link with the gateway 40 by adjusting a pointing direction of the FL antenna 121, and maintains covering the target area by the cell 101 by adjusting a pointing direction of the SL antenna 122.

Installing one gateway 40 for one HAPS 100 requires creating the same number of gateways 40 as HAPSs 100 in accordance with enlargement of an area, in which case, developing the area consumes time, money, and labor-power. Also, it is difficult to install a gateway 40 in an area such as an island region, therefore, a method for enlarging an area with an extended number of HAPSs 100 while having as few gateways 40 as possible is needed.

The HAPS 100 according to the present embodiment has a function of sharing the gateway 40 with another HAPS 100 by wirelessly communicating with the other HAPS 100 directly. For example, two HAPSs 100 can provide a wireless communication service through one gateway 40 by causing a first HAPS 100 being wirelessly connected with the gateway 40, and another second HAPS 100 to wirelessly connect with each other, and causing the first HAPS 100 to relay communication between the second HAPS 100 and the gateway 40.

Figure 2:
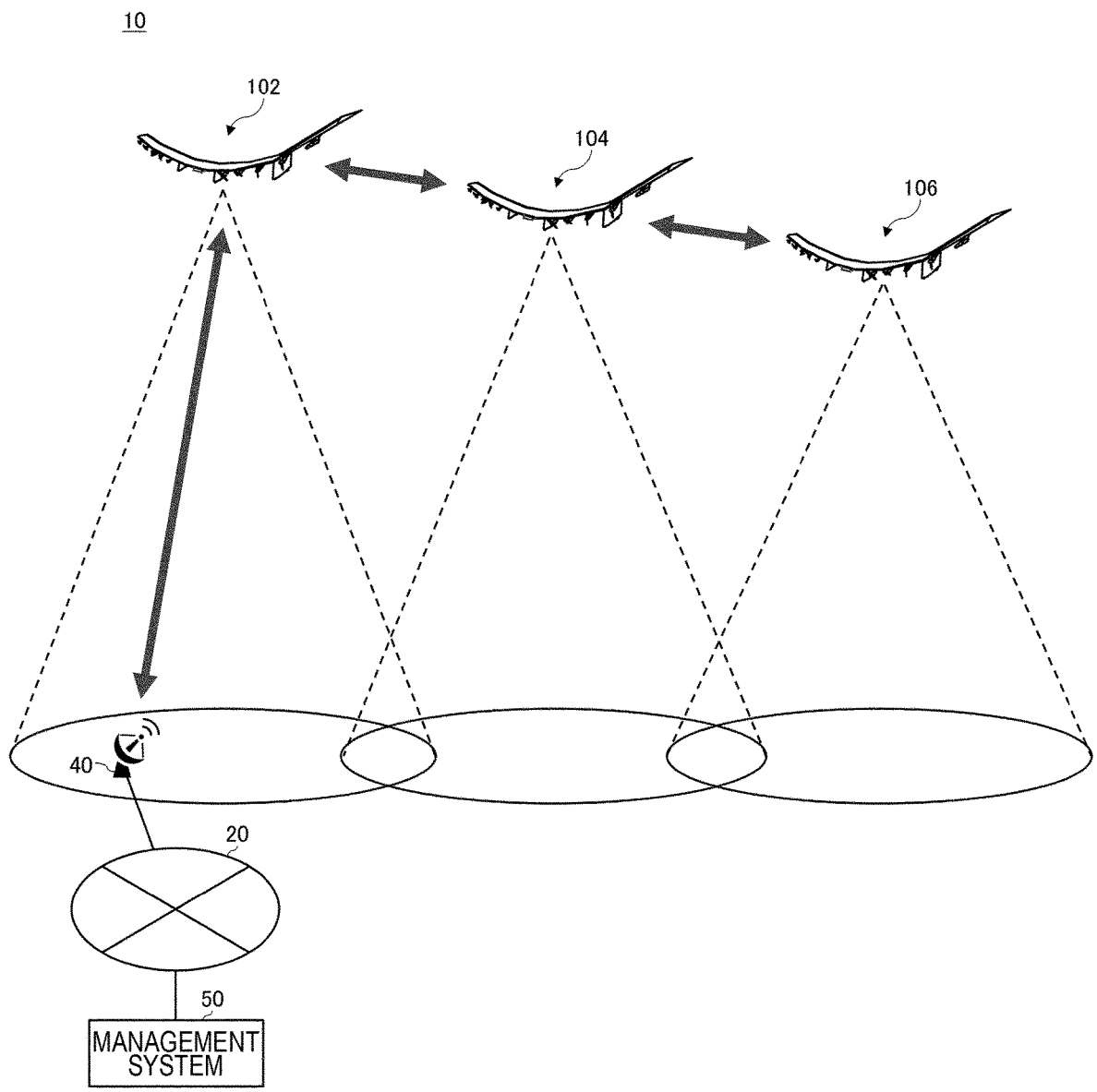
FIG. 2 schematically shows one example of a system 10.

FIG. 2 schematically shows one example of a system 10. The system 10 according to the present embodiment includes a plurality of HAPSs 100 being wirelessly communicable with each other. In FIG. 2, the plurality of HAPSs 100 is illustrated as a HAPS 102 being wirelessly connected with the gateway 40, a HAPS 104 being wirelessly connected with the HAPS 102, and a HAPS 106 being wirelessly connected with the HAPS 104.

In some cases, a rank of the HAPS 102 being wirelessly connected with the gateway 40 is referred to as "Master", a rank of the HAPS 104 being wirelessly connected with the HAPS 102 is referred to as "Slave 1", and a rank of the HAPS 106 being wirelessly connected with the HAPS 104 is referred to as "Slave 2". "Master" may be one example of a first rank. "Slave 1" may be one example of a second rank. "Slave 2" may be one example of a third rank.

The plurality of HAPSs 100 may be connected to each other in planer star network topology. For example, among a plurality of HAPSs 100, a HAPS 100 that is wirelessly connected with the gateway 40 becomes a master node, from which the HAPSs 100 are radially connected to each other in a star network topology.

The HAPS 104 being "Slave 1" may communicate with the HAPS 102 being "Master" via the gateway 40. The HAPS 106 being "Slave 2" may communicate with the gateway 40 via the HAPS 104 being "Slave 1" and the HAPS 102 being "Master". In this way, the HAPS 104 and the HAPS 106 can access the network 20 without arranging on the ground a gateway 40 corresponding to the HAPS 104 and a gateway 40 corresponding to the HAPS 106.

Figure 3:
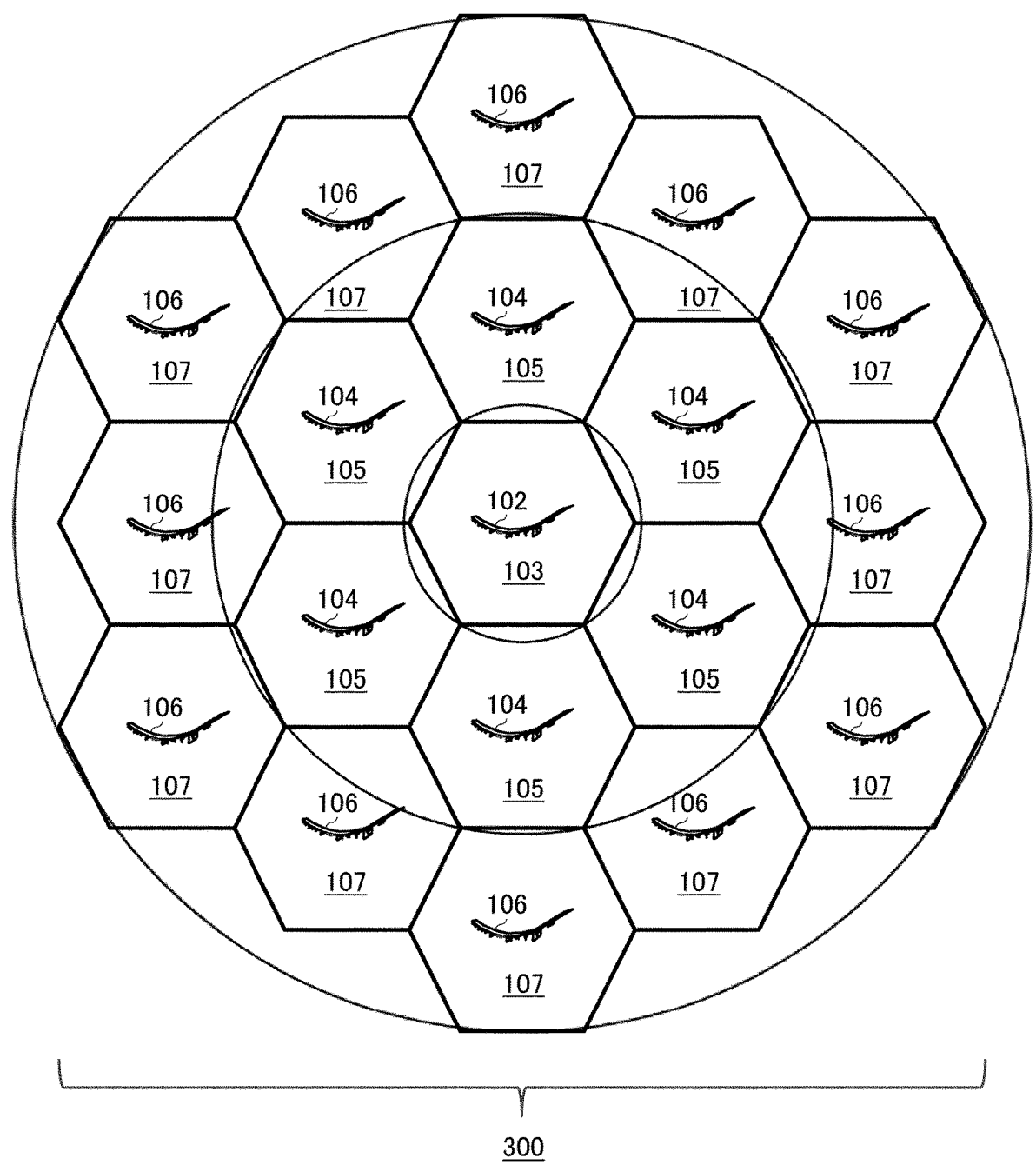
FIG. 3 schematically shows one example of a coverage area 300 formed by a plurality of HAPSs 100 of the system 10.

FIG. 3 schematically shows one example of a coverage area 300 formed by the plurality of HAPSs 100 in the system 10. FIG. 3 illustrates the coverage area 300 formed with a cell 103 formed by the HAPS 102 being "Master", a cell 105 formed by a plurality of HAPSs 104 being "Slave 1", and a cell 107 formed by a plurality of HAPSs 106 being "Slave 2".

In the example shown in FIG. 3, the plurality of HAPSs 104 are flying in each of a plurality of second flight areas arranged so as to surround a first flight area for the HAPS 102, and a plurality of HAPSs 106 are flying in each of a plurality of third flight areas arranged outside the plurality of second flight areas so as to surround the first flight area. Each of the plurality of HAPSs 104 forms each of a plurality of cells 105 arranged so as to surround the cell 103, and each of the plurality of HAPSs 106 forms each of a plurality of cells 107 arranged outside the plurality of cells 105 so as to surround the cell 103. According to the example shown in FIG. 3, one gateway 40 can be shared between 19 HAPSs 100.

In some cases, an area covered by the cell 103 is referred to as "zone 0", an area covered by the plurality of cells 105 is referred to as "zone 1", and an area covered by the plurality of cells 107 is referred to as "zone 2". "Zone 1" is a group of coverage areas closest from "zone 0" in each and every direction. "Zone 2" is a group of coverage areas having "zone 1" on a straight line between "zone 2" and "zone 0".

Figure 4:
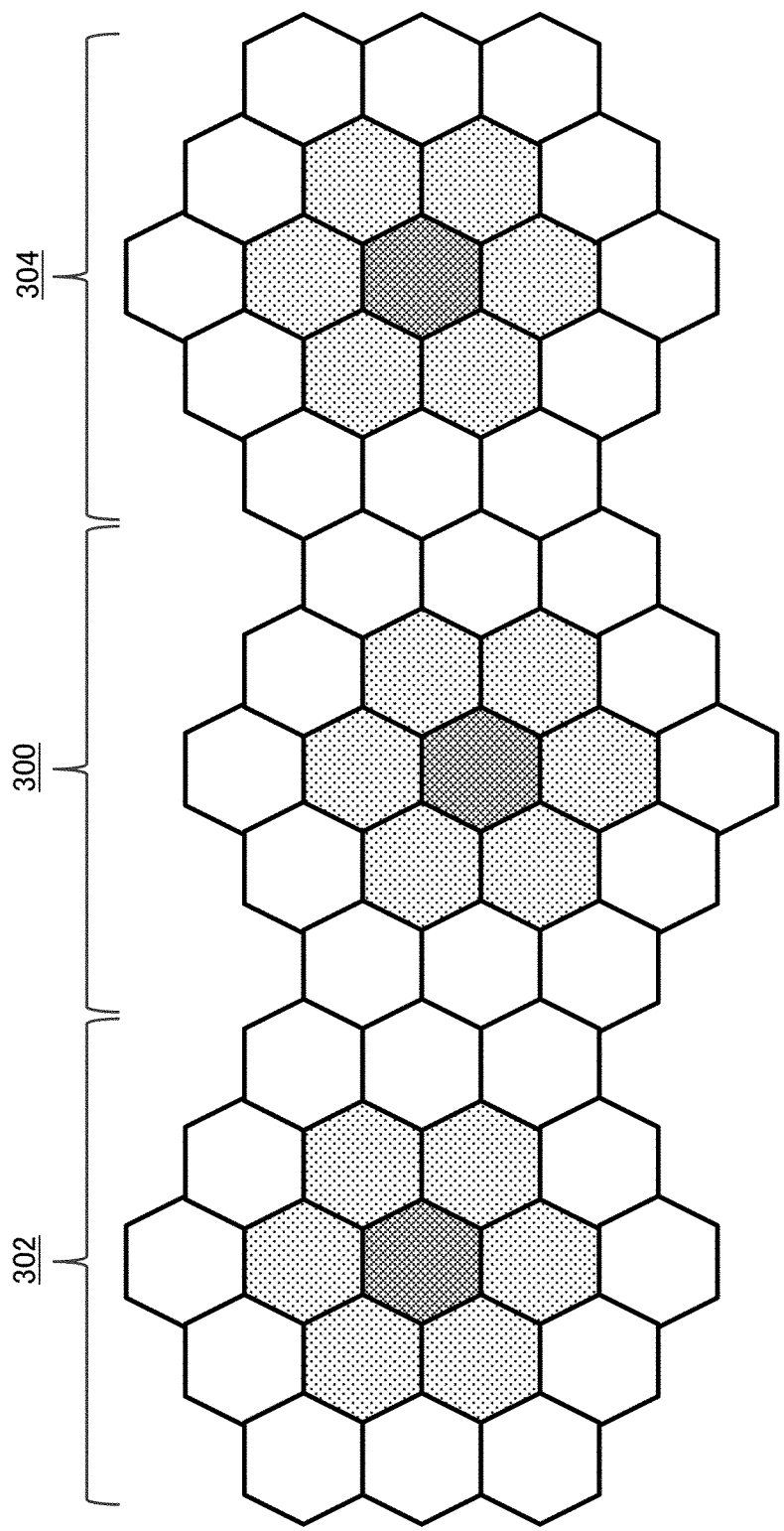
FIG. 4 schematically shows one example of a coverage area 300, a coverage area 302, and a coverage area 304.

FIG. 4 schematically shows one example of the coverage area 300, a coverage area 302, and a coverage area 304 which are formed by the plurality of HAPSs 100 in the system 10. FIG. 4 illustrates a case in which three gateways 40 are used. According to the example shown in FIG. 4, the three gateways 40 can be shared between 57 HAPSs 100. Likewise, according to the system 10 of the present embodiment, a large area can be covered by a relatively small number of gateways 40.

Figure 5:
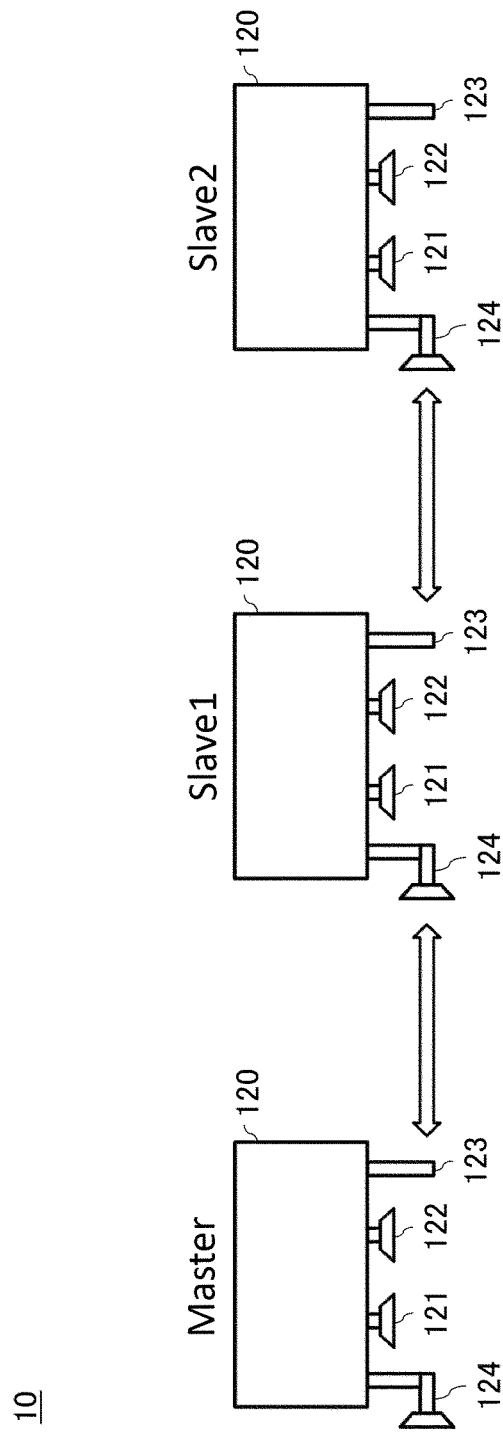
FIG. 5 schematically shows one example of a communication situation in the system 10.

FIG. 5 schematically shows one example of a communication situation in the system 10. In order to schematically show the communication situation, illustrated here are a central part 120 of a "Master" HAPS 100 (may be referred to as a "Master" object), a central part 120 of a "Slave 1" HAPS 100 (may be referred to as a "Slave 1" object), and a central part 120 of a "Slave 2" HAPS 100 (may be referred to as a "Slave 2" object).

There are a FL antenna 121, a SL antenna 122, a flying object communication antenna 123, and a flying object communication antenna 124 installed on the central part 120. The FL antenna 121 may be one example of a first antenna. The SL antenna 122 may be one example of a second antenna. The flying object communication antenna 123 may be one example of a third antenna for communicating with another HAPS 100. The flying object communication antenna 124 may be one example of a fourth antenna for communicating with another HAPS 100.

The flying object communication antenna 123 may be an omni-directional antenna (may also be referred to as an omni antenna, an omnidirectional antenna, or the like). The flying object communication antenna 124 may be an omni directional trackable antenna capable of tracking all directions by moving a directional antenna.

The "Master" object periodically broadcasts its own position information, and a beacon signal including rank information representing that the flying object is "Master", by means of the flying object communication antenna 123. The beacon signal may be broadcasted at irregular timing.

The "Slave 1" object receives the beacon signal transmitted by the "Master" object by means of the flying object communication antenna 124, tracks the "Master" object with the use of the position information included in the beacon signal by means of the flying object communication antenna 124, and communicates with the "Master" object. The "Slave 1" object periodically broadcasts its own position information, and a beacon signal including rank information representing that the flying object is "Slave 1", by means of the flying object communication antenna 123. The beacon signal may be broadcasted at irregular timing.

The "Slave 2" object receives the beacon signal transmitted by the "Slave 1" object by means of the flying object communication antenna 124, tracks the "Slave 1" object with the use of the position information included in the beacon signal by means of the flying object communication antenna 124, and communicates with the "Slave 1" object. The "Slave 2" object periodically broadcasts its own position information, and a beacon signal including rank information representing that the flying object is "Slave 2", by means of the flying object communication antenna 123. The beacon signal may be broadcasted at irregular timing.

In the system 10, a communication frequency used between the "Master" object and the "Slave 1" object may be different from a communication frequency used between the "Slave 1" object and the "Slave 2" object. In this way, interference can be avoided between communication between the "Master" object and the "Slave 1" object, and communication between the "Slave 1" object and the "Slave 2" object.

Figure 6:
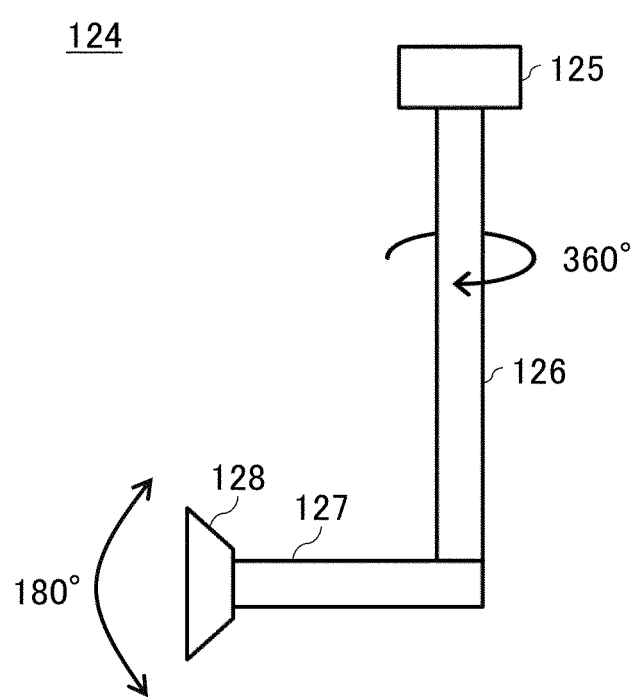
FIG. 6 schematically shows one example of a connection processing flow performed by the HAPS 100.

FIG. 6 schematically shows one example of the flying object communication antenna 124. The flying object communication antenna 124 has a base 125, a shaft 126, a supporting portion 127, and a directional antenna 128.

The base 125 is installed on the central part 120, and rotatably supports the shaft 126. The shaft 126 may be able to rotate 360 degrees around a central axis thereof. The supporting portion 127 is arranged on the shaft 126, and supports the directional antenna 128. The supporting portion 127 supports the directional antenna 128 in a way that the directional antenna 128 can tilt in a vertical direction. A tilt range of the directional antenna 128 may be 180 degrees.

Since the base 125 supports the shaft 126 in a way that the shaft 126 can rotate 360 degrees, and the supporting portion 127 supports the directional antenna 128 in the way that the directional antenna 128 can tilt 180 degrees in the vertical direction, radio waves from all directions can be received by the directional antenna 128, and radio waves can be transmitted in all directions. The control apparatus 200 can track radio waves in all directions by controlling the rotation of the shaft 126 by virtue of the base 125, and the tilting of the directional antenna 128 by virtue of the supporting portion 127.

Figure 7:
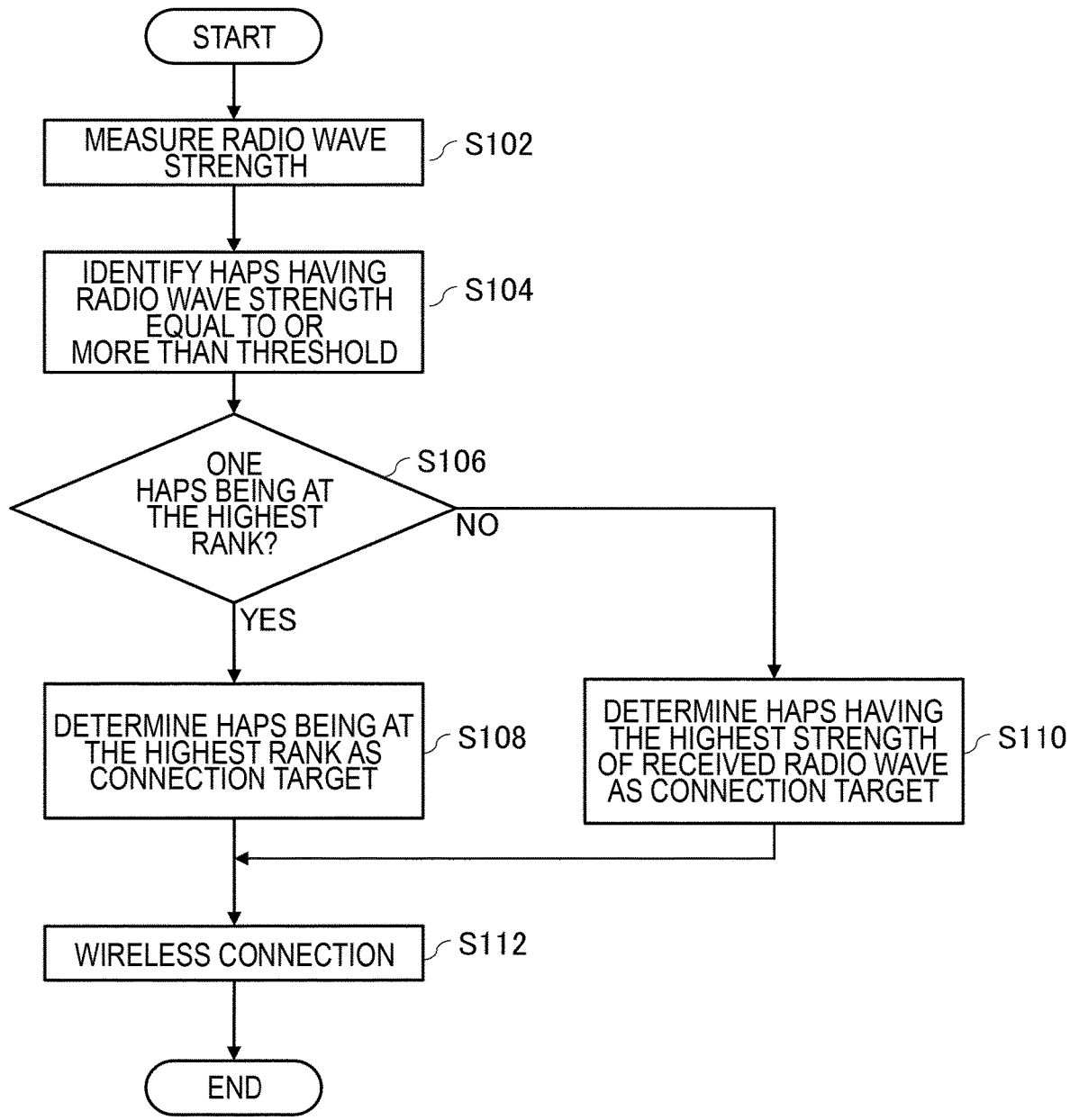
FIG. 7 schematically shows one example of a connection performed by the HAPS 100.

FIG. 7 schematically shows one example of a connection processing flow performed by the HAPS 100. In order to have a flexibility in an operation place, and a cellular phone to be connected with, it is desirable for the HAPS 100 to be able to determine a connection target based on a rank, without recognizing a zone. In that case, there is an issue in determining which HAPS 100 to connect with, when beacon signals are received from a plurality of HAPSs 100.

In the system 10 according to the present embodiment, for example, the HAPS 100 functioning as "Master" first moves to a flight area instructed by the management system 50, and wirelessly connects with the gateway 40. Next, the HAPS 100 that has moved into the flight area instructed by the management system 50 determines by itself a HAPS 100 to connect with by executing the processing shown in FIG. 7, and wirelessly connects with the HAPS 100.

In step (a step may be referred to as S in short) 102, the HAPS 100 measures strength of a radio wave received from another HAPS 100. The HAPS 100 may measure strength of a received radio wave of a beacon signal periodically broadcasted by another HAPS 100.

In S104, the HAPS 100 identifies a HAPS 100 from which the strength of the radio wave received and measured in S102 is a predetermined threshold or more. If there is one HAPS 100 being at the highest rank, (YES at S106), the processing proceeds to S108. Among the HAPSs 100 identified in S104, if there are HAPSs 100 being at different ranks and a plurality of HAPSs 100 are at the highest rank, or if the HAPSs 100 identified in S104 are at the same rank (NO at S106), the processing proceeds to S110.

In S108, the HAPS 100 determines a HAPS 100 being at the highest rank as a connection target. In S110, among the plurality of HAPSs 100 being at the highest rank, the HAPS 100 determines to connect with a HAPS 100 from which the strength of the radio wave received is the strongest. In S112, the HAPS 100 wirelessly connects with the HAPS 100 determined to be connected with. Then, the connection processing ends.

Figure 8:
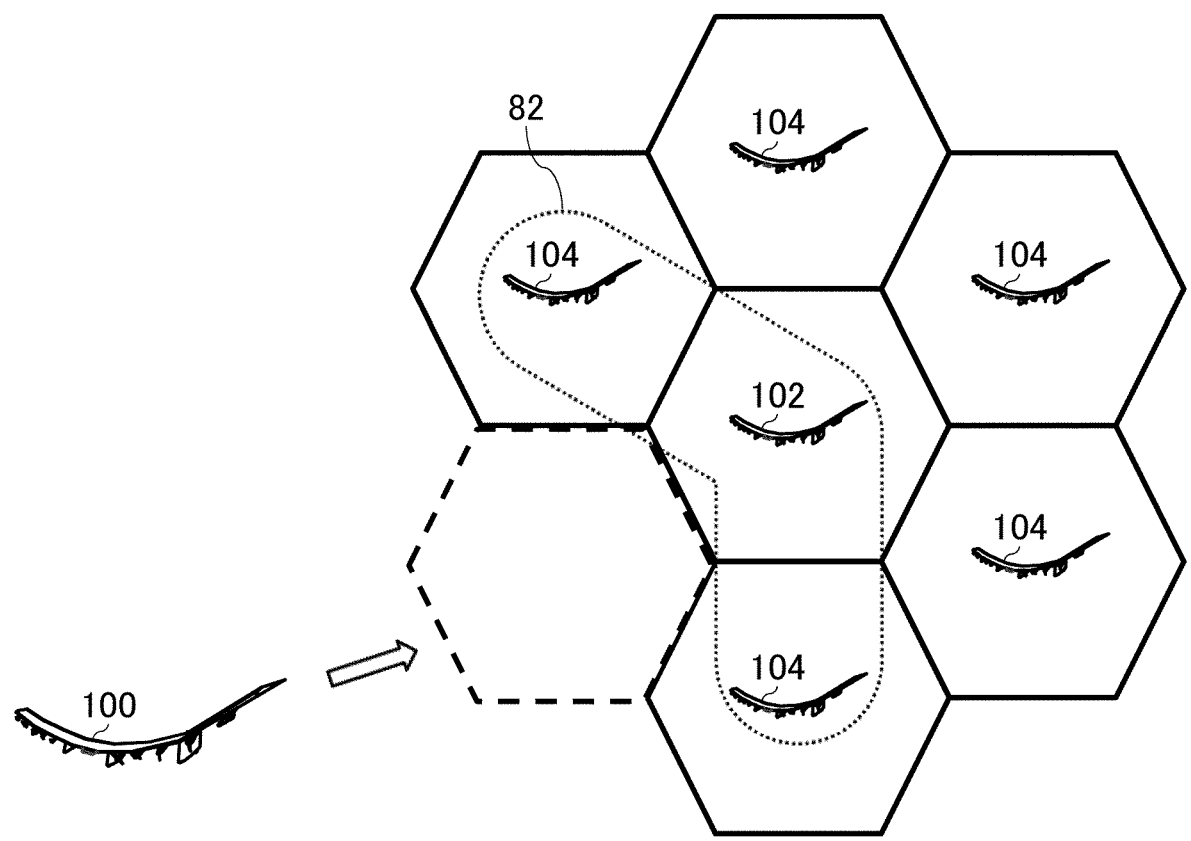
FIG. 8 schematically shows one example of a connection performed by the HAPS 100.

FIG. 8 schematically shows one example of connection processing performed by the HAPS 100. Here, a case is described in which a new HAPS 100 has reached "zone 1". The HAPS 100 may move to a flight area designated by the management system 50 without recognizing a zone.

The HAPS 100 that has reached the designated flight area then measures strength of a radio wave received from another HAPS 100. Then, the HAPS 100 identifies another HAPS 100 from which the strength of the radio wave received is stronger than the predetermined threshold. In the example shown in FIG. 8, one HAPS 102 and two HAPSs 104 included in a group 82 are identified.

In the group 82, since there is one HAPS 102 being at the highest rank, the HAPS 100 determines to connect with the HAPS 102. Then, the HAPS 100 wirelessly connects with the HAPS 102 and functions as "Slave 1" itself.

Figure 9:
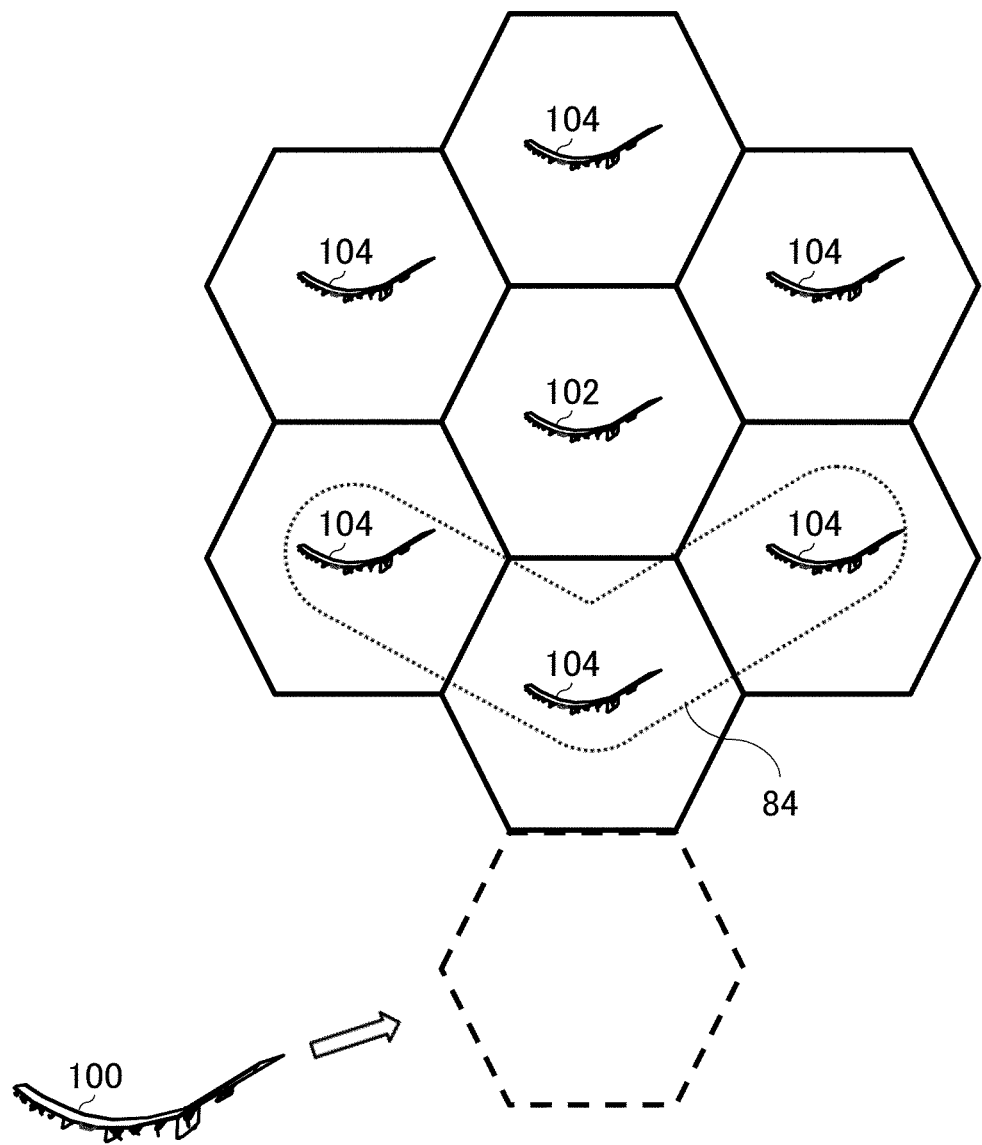
FIG. 9 schematically shows one example of a connection performed by the HAPS 100.

FIG. 9 schematically shows one example of connection processing performed by the HAPS 100. Here, a case is described in which a new HAPS 100 has reached "zone 2". The HAPS 100 may move to a flight area designated by the management system 50 without recognizing a zone.

The HAPS 100 that has reached the designated flight area then measures strength of a radio wave received from another HAPS 100. Then, the HAPS 100 identifies another HAPS 100 from which the strength of the radio wave received is stronger than the predetermined threshold. In the example shown in FIG. 9, for example, three HAPSs 104 included in a group 84 are identified. Depending on the threshold, only one HAPS 104 being closest to the HAPS 100 is identified.

In the group 84, since all the HAPSs 104 are at the same rank, among the three HAPSs 104, the HAPS 100 determines a HAPS 104 from which the strength of the radio wave received is the strongest to connect with. When only one HAPS 104 being closest to the HAPS 100 is identified, the HAPS 100 determines to connect with this HAPS 104.

For example, if a connection target is determined merely based on the strength of the received radio wave, in the example shown in FIG. 8, the HAPS 104 may be determined to be connected with. In that case, the HAPS 100 would communicate with the gateway 40 via the HAPS 104 and the HAPS 102, which would cause a communication delay and unnecessary use of relay resource.

Also, for example, if a connection target is determined merely based on the rank, in the example shown in FIG. 9, the HAPS 102 may be determined to be connect with. In that case, because the HAPS 100 and the HAPS 102 to be wirelessly connected together have a long distance between them, usually communication quality decreases, which then causes a problem in performance.

On the other hand, by determining a connection target according to the processing algorism shown in FIG. 7, it is possible to prevent the HAPS 104 from being selected as the connection target in the example shown in FIG. 8, and to select the HAPS 102 as the connection target. This enables the communication delay and the unnecessary use of relay resource to be prevented. In addition, it is possible to exclude the HAPS 102 from being a candidate for the connection target in the example shown in FIG. 9. This enables the decrease in communication quality to be prevented.

Figure 10:
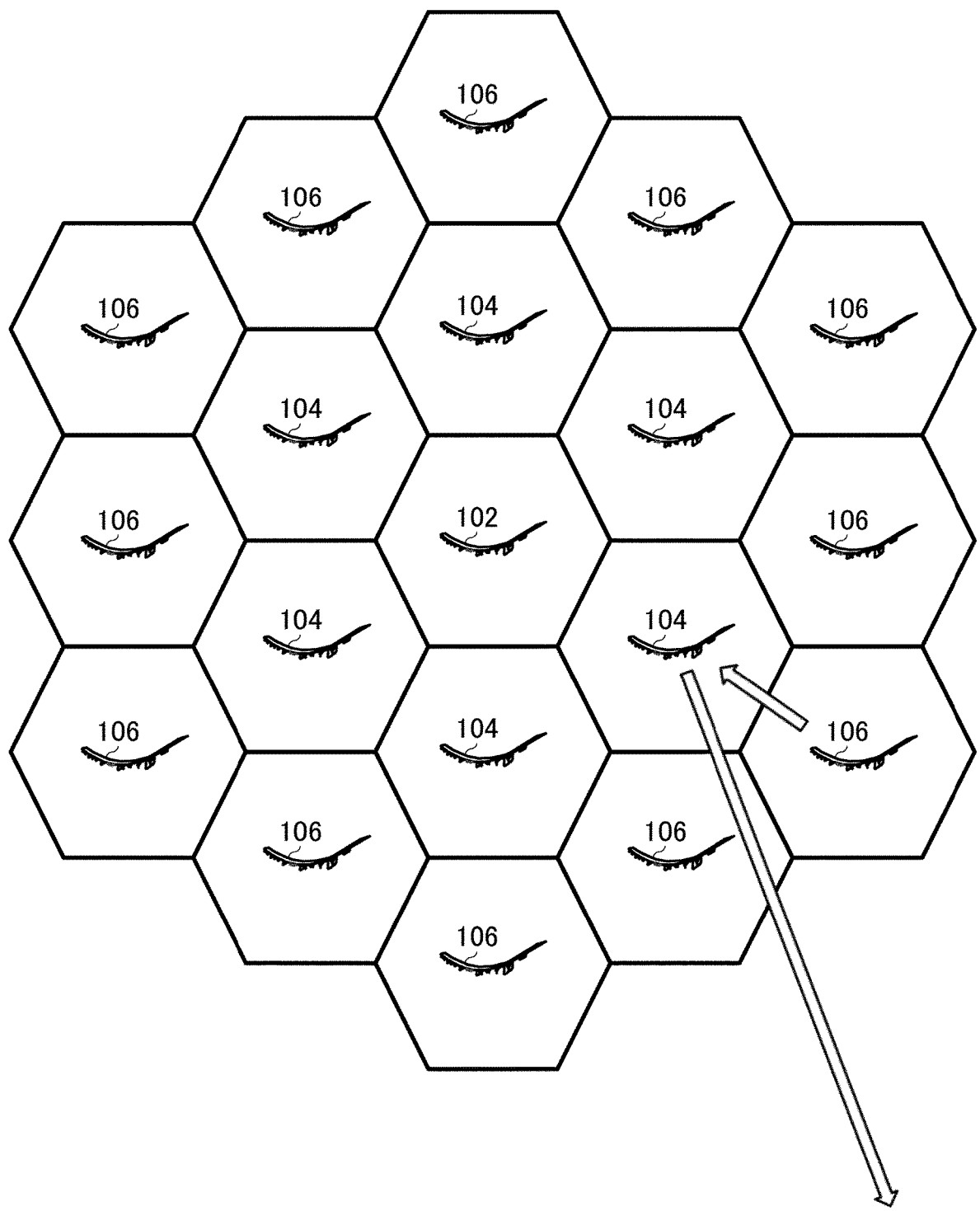
FIG. 10 schematically shows one example of replacement processing for the HAPS 100 in the system 10.

FIG. 10 schematically shows one example of replacement processing for the HAPS 100 in the system 10. In the system 10, when any HAPS 100 among a plurality of HAPSs 100 breaks down or stops forming a cell 101 in order to move down to the ground for maintenance, a HAPS 100 which is at a rank lower than this HAPS 100, and which had been wirelessly connected with this HAPS 100 replaces this HAPS 100.

For example, when a HAPS 104 withdraws, a HAPS 106 which had been wirelessly connected to this HAPS 104 replaces this HAPS 104. After the replacement, this HAPS 106 functions as "Slave 1", and puts rank information representing that this HAPS 106 is "Slave 1" in a beacon signal.

Figure 11:
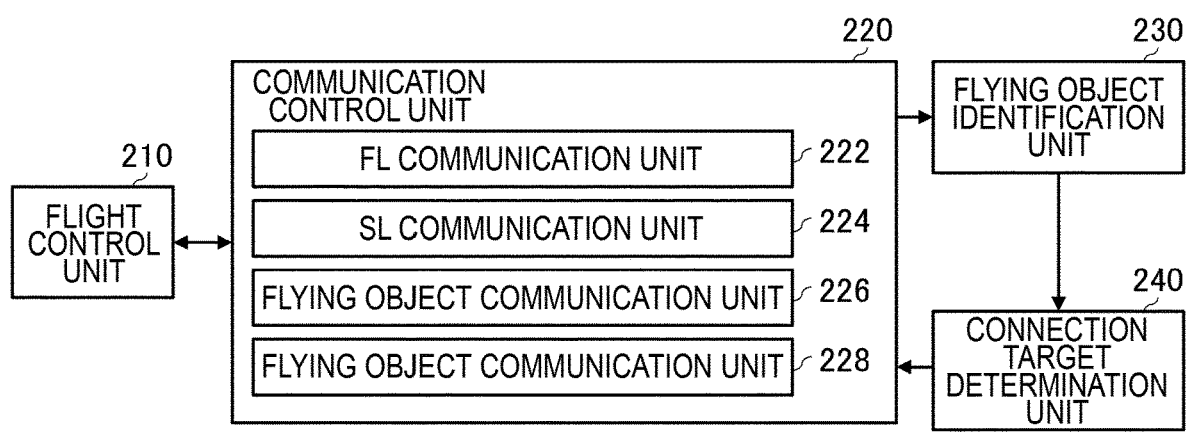
FIG. 11 schematically shows one example of a functional configuration of a control apparatus 200.

FIG. 11 schematically shows one example of a functional configuration of a control apparatus 200. The control apparatus 200 includes a flight control unit 210, a communication control unit 220, a flying object identification unit 230, and a connection target determination unit 240.

The flight control unit 210 controls a flight of a HAPS 100 (may be referred to as its own flying object) on which the control apparatus 200 is mounted. The flight control unit 210 may control flight of its own flying object by controlling rotation of the propeller 130, changing an angle of the flap or the elevator, and so forth. The flight control unit 210 may include various types of sensors including a position measuring sensor such as a GPS sensor, a gyro sensor, and an acceleration sensor etc., and manage a locate, a moving direction, and a moving speed of its own flying object.

The flight control unit 210 may control flight of its own flying object according to an instruction received from the management system 50. For example, the flight control unit 210 controls flight of its own flying object such that its own flying object moves to a flight area designated by the management system 50. Also, the flight control unit 210 controls flight of its own flying object in order to perform a fixed-point flight in the flight area designated by the management system 50.

Note that, the control apparatus 200 may not include the flight control unit 210. In that case, a flight controller for controlling flight of its own flying object is arranged within the central part 120 so as to be communicable with the control apparatus 200.

The communication control unit 220 has a FL communication unit 222, a SL communication unit 224, and a flying object communication unit 226, and a flying object communication unit 228. The FL communication unit 222 wirelessly connects with the gateway 40 by means of the FL antenna 121, and establishes a feeder link with the gateway 40. The SL communication unit 224 forms the cell 101 on the ground by means of the SL antenna 122. The SL communication unit 224 wirelessly connects with a user terminal 30 within the cell 101, and establishes a service link with the user terminal 30.

The flying object communication unit 226 wirelessly communicates with another HAPS 100 by means of the flying object communication antenna 123. The flying object communication unit 226 may be one example of a first flying object communication unit. The flying object communication unit 228 wirelessly communicates with another HAPS 100 by means of the flying object communication antenna 124. The flying object communication unit 228 may be one example of a second flying object communication unit.

The flying object communication unit 226 periodically or irregularly broadcasts, when its own flying object is wirelessly connected with the gateway 40 by means of the FL antenna 121, i.e., when its own flying object is functioning as "Master", a beacon signal including rank information representing that its own flying object is "Master", and position information for its own flying object, by means of the flying object communication antenna 123. The flying object communication unit 226 may be one example of a beacon signal transmission unit.

The flying object communication unit 226 periodically or irregularly transmits, when its own flying object is wirelessly connected with a "Master" object by means of the flying object communication antenna 124, i.e., when its own flying object is functioning as "Slave 1", a beacon signal including rank information representing that its own flying object is "Slave 1", and position information for its own flying object, by means of the flying object communication antenna 123.

The flying object communication unit 226 periodically or irregularly transmits, when its own flying object is wirelessly connected with the "Slave 1" object by means of the flying object communication antenna 124, i.e., when its own flying object is functioning as "Slave 2", a beacon signal including rank information representing that its own flying object is "Slave 2", and position information for its own flying object by means of the flying object communication antenna 123.

When the flying object communication unit 226 is wirelessly connected with the gateway 40, i.e., when functioning as "Master", the flying object communication unit 226 may use a frequency different from when it is wirelessly connected with a "Master" object, i.e., when functioning as "Slave 1".

The flying object communication unit 226 may put in a beacon signal, when the flying object communication unit 226 is functioning as "Slave 1" or "Slave 2", information that enables its own flying object to be identified from other HAPSs 100. The flying object communication unit 226 puts in the beacon signal, an identification number for a cell formed by the SL antenna 122, for example. The ECGI (E-UTRAN Cell Global ID) consists of eNB (eNodeB) or the like can be adopted as the identification number for the cell.

The flying object communication unit 228 communicates with a "Master" object by means of the flying object communication antenna 124, when the flying object communication unit 228 is wirelessly connected with the "Master" object by means of the flying object communication antenna 124, i.e., when its own flying object is functioning as "Slave 1". The flying object communication unit 228 tracks the "Master" object by moving the directional antenna 128, by controlling the base 125 and the supporting portion 127. The flying object communication unit 228 may track the "Master" object by moving the directional antenna 128 by using position information for the "Master" object, which is included in a beacon signal transmitted by the "Master" object. The flying object communication unit 228 may be one example of a flying object tracking unit.

The flying object communication unit 228 communicates with a "Slave 1" object by means of the flying object communication antenna 124, when the flying object communication unit 228 is wirelessly connected with the "Slave 1" object by means of the flying object communication antenna 124, i.e., when its own flying object is functioning as "Slave 2". The flying object communication unit 228 tracks the "Slave 1" object by moving the directional antenna 128, by controlling the base 125 and the supporting portion 127. The flying object communication unit 228 may track the "Slave 1" object by moving the directional antenna 128 based on position information for the "Slave 1" object, which is included in a beacon signal transmitted by the "Slave 1" object.

The flying object communication unit 228 measures strength of a radio wave received from another HAPS 100 by means of the flying object communication antenna 124. The flying object communication unit 228 measures the strength of the received radio wave by using a beacon signal broadcasted by the other HAPS 100, for example. The flying object communication unit 228 may be one example of a radio wave strength measurement unit.

The flying object identification unit 230 identifies a plurality of HAPSs 100 to be candidates for a connection target, for example when wirelessly connecting with another HAPS 100 after moving into a flight area designated by the management system 50, based on strength of a radio wave received from each of a plurality of other HAPSs 100 measured by the flying object communication unit 228. The flying object identification unit 230 may identify as candidates for a connection target, HAPSs 100 from which the strength of the radio wave received is more than a predetermined threshold. This threshold can be set at any value, and can be changed.

The connection target determination unit 240 determines a HAPS 100 to be connected, among the HAPSs 100 identified by the flying object identification unit 230. When there is one HAPS 100 identified by the flying object identification unit 230, the connection target determination unit 240 may identify this HAPS 100 as the connection target.

When a plurality of HAPSs 100 is identified by the flying object identification unit 230, the connection target determination unit 240 may determine a connection target based on strength of a radio wave received from each of the plurality of HAPSs 100, and the ranks of the plurality of HAPSs 100.

The connection target determination unit 240 determines as a connection target, for example, when there is one HAPS 100 having the highest rank among the plurality of HAPSs 100 identified by the flying object identification unit 230, the flying object having this highest rank. For example, when one "Master" object and one or more "Slave 1" objects are identified by the flying object identification unit 230, the connection target determination unit 240 determines the "Master" object as a connection target. For another example, when one "Slave 1" object and one or more "Slave 2" objects are identified by the flying object identification unit 230, the connection target determination unit 240 determines the "Slave 1" object as a connection target.

The connection target determination unit 240 determines as a connection target, for example, when there is more than one HAPSs 100 having the highest rank among the plurality of HAPSs 100 identified by the flying object identification unit 230, a HAPS 100 from which the strength of the received radio wave measured by the flying object communication unit 228 is the highest among the plurality of HAPSs 100 having this highest rank. For example, when there is a plurality of "Slave 1" objects and one or more "Slave 2" objects identified by the flying object identification unit 230, the connection target determination unit 240 determines as a connection target a "Slave 1" object from which the strength of the received radio wave measured by the flying object communication unit 228 is the highest among the plurality of "Slave 1" object.

The connection target determination unit 240 determines as a connection target, for example, when a plurality of HAPSs 100 identified by the flying object identification unit 230 has the same rank, a HAPS 100 from which the strength of the received radio wave measured by the flying object communication unit 228 is the highest among this plurality of HAPSs 100. For example, when there is a plurality of "Slave 1" objects identified by the flying object identification unit 230, the connection target determination unit 240 determines as a connection target a "Slave 1" object from which the strength of the received radio wave measured by the flying object communication unit 228 is the highest among the plurality of "Slave 1" objects. For another example, when there is a plurality of "Slave 2" objects identified by the flying object identification unit 230, the connection target determination unit 240 determines as a connection target a "Slave 2" object from which the strength of the received radio wave measured by the flying object communication unit 228 is the highest among the plurality of "Slave 2" objects.

Figure 12:
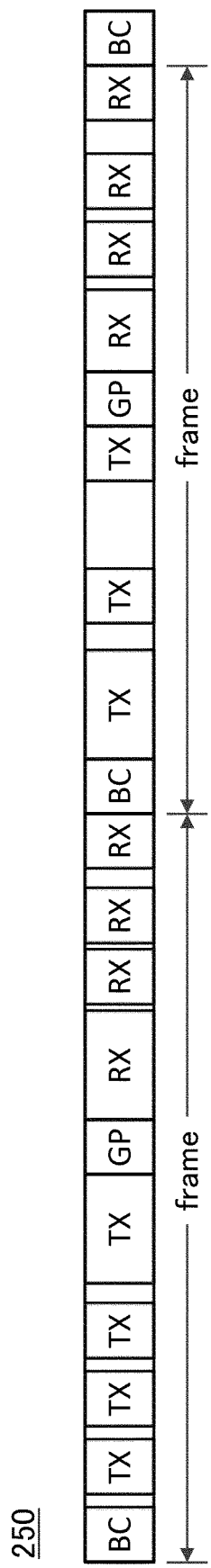
FIG. 12 shows an allocation example 250 of a beacon signal.

FIG. 12 shows an allocation example 250 of a beacon signal. The flying object communication unit 226 may put a beacon signal in each frame, as shown in FIG. 12. In FIG. 12, an example is illustrated in which the beacon signal is allocated at the beginning of the frame, whereas allocation of the beacon signal is not limited to this example. The beacon signal can be allocated at any position in the frame. In addition, the flying object communication unit 226 may put a beacon signal in every arbitrary frame such as every two frames, instead of in every frame.

Figure 13:
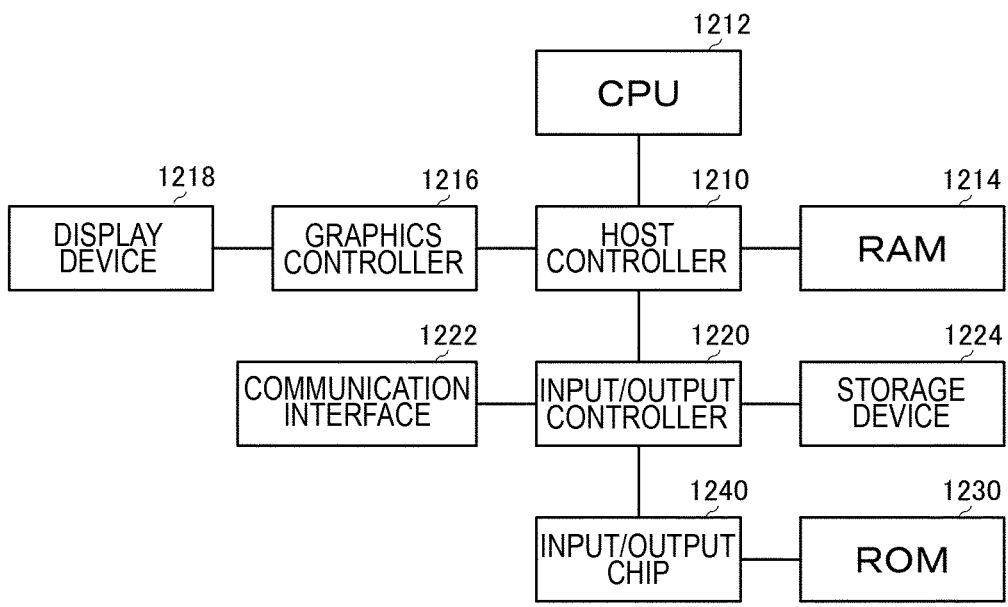
FIG. 13 schematically shows one example of a hardware configuration of a computer 1200 that functions as the control apparatus 200.

FIG. 13 schematically shows one example of a hardware configuration of a computer 1200 that functions as the control apparatus 200. A program installed on the computer 1200 can cause the computer 1200 to function as one or more "units" of the device according to the above embodiment, or cause the computer 1200 to execute an operation or one or more "units" associated with the device according to the above embodiment, and/or cause the computer 1200 to execute a process or steps of the process according to the above embodiment. Such a program may be executed by a CPU 1212 in order to cause the computer 1200 to execute certain operations associated with some or all of blocks of the flowcharts and the block diagrams described herein.

The computer 1200 according to the present embodiment includes the CPU 1212, a RAM 1214, and a graphics controller 1216, which are interconnected by a host controller 1210. In addition, the computer 1200 includes input/output units such as a communication interface 1222, a storage device 1224, and a DVD driver and an IC card drive, which are connected to the host controller 1210 through an input/output controller 1220. The storage device 1224 may be a hard disk drive, a solid-state drive, or the like. The computer 1200 also includes a ROM 1230 and a legacy input/output unit such as a keyboard, which are connected to the input/output controller 1220 via an input/output chip 1240.

The CPU 1212 operates according to the programs stored in the ROM 1230 and the RAM 1214, thereby controlling each unit. The graphics controller 1216 obtains image data which is generated, by the CPU 1212, in a frame buffer or the like provided in the RAM 1214 or in itself so as to cause the image data to be displayed on a display device 1218.

The communication interface 1222 communicates with other electronic devices via a network. The storage device 1224 stores programs and data used by the CPU 1212 in the computer 1200. The IC card drive reads the program and data from an IC card, and/or writes the program and data to the IC card.

The ROM 1230 stores, in itself, a boot program or the like that is executed by the computer 1200 during activation, and/or a program that depend on hardware of the computer 1200. The input/output chip 1240 may also connect various input/output units to the input/output controller 1220 via a USB port, a parallel port, a serial port, a keyboard port, a mouse port, or the like.

A program is provided by a computer readable storage medium such as the DVD-ROM or the IC card. The program is read from the computer readable storage medium, installed in the storage device 1224, the RAM 1214, or the ROM 1230, which is also an example of the computer readable storage medium, and executed by the CPU 1212. Information processing written in these programs are read by the computer 1200, and provides a link between the program and various types of hardware resources described above. A device or a method may be configured by implementing the operation or processing of the information according to the use of the computer 1200.

For example, when a communication is executed between the computer 1200 and an external device, the CPU 1212 may execute a communication program loaded in the RAM 1214, and instruct the communication interface 1222 to perform the communication processing based on the processing written in the communication program. The communication interface 1222, under the control of the CPU 1212, reads transmission data stored in a transmission buffer region provided in a recording medium such as the RAM 1214, the storage device 1224, the DVD-ROM, or the IC card, transmits the read transmission data to the network, or writes reception data received from the network into a receiving buffer region or the like provided on the recording medium.

In addition, the CPU 1212 may cause all or a necessary portion of a file or a database to be read into the RAM 1214, the file or the database having been stored in an external recording medium such as the storage device 1224, the DVD driver (DVD-ROM), the IC card, etc., and perform various types of processing on the data on the RAM 1214. Then, the CPU 1212 may write back the processed data to the external recording medium.

Various types of information such as various types of programs, data, tables, and databases may be stored in recording media and subjected to the information processing. The CPU 1212 may execute various types of processing on the data read from the RAM 1214 to write back a result to the RAM 1214, the processing being described throughout the present disclosure, specified by an instruction sequence of the program, and including various types of operations, information processing, condition determinations, conditional branching, unconditional branching, information retrievals/replacements, or the like. Further, the CPU 1212 may search for information in the file, the database, or the like in the recording medium. For example, when a plurality of entries each having an attribute value of a first attribute associated with an attribute value of a second attribute are stored in the recording medium, the CPU 1212 may search, from the plurality of entries, for an entry that matches a condition in which the attribute value of the first attribute is specified, and read the attribute value of the second attribute stored in the entry, thereby obtaining the attribute value of the second attribute associated with the first attribute that satisfies a predetermined condition.

The program or software module described above may be stored on the computer 1200 or in a computer readable storage medium near the computer 1200. Further, a recording medium such a hard disk or a RAM provided in a server system connected to a dedicated communication network or the Internet can be used as a computer readable storage medium, thereby providing the program to the computer 1200 via the network.

The flowchart and the blocks in the block diagrams according to the present embodiment may represent a step of a process in which an operation is executed or a "part" of a device which has a role of executing an operation. A specific step and "part" may be implemented by a dedicated circuit, a programmable circuit supplied along with a computer readable instruction stored on a computer readable storage medium, and/or a processor supplied along with the computer readable instruction stored on the computer readable storage medium. The dedicated circuit may include a digital and/or analog hardware circuit, or may include an integrated circuit (IC) and/or a discrete circuit. The programmable circuit may include, for example, a reconfigurable hardware circuit including logical AND, logical OR, logical XOR, logical NAND, logical NOR, and other logical operations, and a flip-flop, a register, and a memory element, such as a field programmable gate array (FPGA) and a programmable logic array (PLA).

The computer readable storage medium may include any tangible device capable of storing an instruction executed by an appropriate device, so that the computer readable storage medium having the instruction stored thereon includes a product including an instruction that may be executed in order to provide means to execute an operation specified by a flowchart or a block diagram. Examples of the computer readable storage medium may include an electronic storage medium, a magnetic storage medium, an optical storage medium, an electromagnetic storage medium, a semiconductor storage medium, or the like. More specific examples of computer readable storage media may include a floppy disc (registered trademark), a diskette, a hard disk, a random access memory (RAM), a read-only memory (ROM), an erasable programmable read-only memory (EPROM or Flash memory), an electrically erasable programmable read-only memory (EEPROM), a static random access memory (SRAM), a compact disc read-only memory (CD-ROM), a digital versatile disk (DVD), a BLU-RAY (registered trademark) disc, a memory stick, an integrated circuit card, etc.

The computer readable instruction may include either of source code or object code written in any combination of one or more programming languages including: an assembler instruction, an instruction-set-architecture (ISA) instruction, a machine instruction, a machine dependent instruction, a microcode, a firmware instruction, state-setting data; or an object oriented programming language such as Smalltalk (registered trademark), JAVA (registered trademark), C++, or the like; and a conventional procedural programming language such as a "C" programming language or a similar programming language.

The computer readable instruction may be provided to a general purpose computer, a special purpose computer, or a processor or a programmable circuit of another programmable data processing apparatus locally or via a local area network (LAN), a wide area network (WAN) such as the Internet or the like so that the general purpose computer, the special purpose computer, or the processor or the programmable circuit of another programmable data processing apparatus executes the computer readable instruction to provide means to execute operations specified by the flowchart or the block diagram. Examples of processors include computer processors, processing units, microprocessors, digital signal processors, controllers, microcontrollers, and the like.

In the above embodiment, a case in which the flying object communication antenna 124 described as one example of the fourth antenna is the omni directional trackable antenna has been mainly described by way of example, whereas the flying object communication antenna 124 is not limited to be omni directional trackable antenna. The fourth antenna may be an omni-directional antenna. In that case, it is preferable for a plurality of HAPSs 100 being at the same rank to use a frequency different from each other for communication using the fourth antenna. That is, the plurality of HAPSs 100 being at the same rank may use the frequency different from each other for executing wireless communication using the fourth antenna.

While the embodiments of the present invention have been described, the technical scope of the present invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the present invention.

The operations, procedures, steps, stages etc. of every processing performed by an apparatus, system, program, and method shown in the claims, specification, or diagrams can be performed in any order as long as the order is not indicated by "prior to," "before," or the like and as long as the output from a previous processing is not used in a later processing. Even if the operation flow is described with phrases such as "first" or "next" in the claims, specification, or diagrams, they do not necessarily mean that the flow must be performed in this order.

EXPLANATION OF REFERENCES

10: system;
20: network;
30: user terminal;
40: gateway;
50: management system;
82: group;
84: group;
100: HAPS;
101: cell;
102: HAPS;
103: cell;
104: HAPS;
105: cell;
106: HAPS;
107: cell;
110: fuselage;
120: central part;
121: FL antenna;
122: SL antenna;
123: flying object communication antenna;
124: flying object communication antenna;
125: base;
126: shaft;
127: supporting portion;
128: directional antenna;
130: propeller;
140: pod;
150: solar panel;
200: control apparatus;
210: flight control unit;
220: communication control unit;
222: FL communication unit;
224: SL communication unit;
226: flying object communication unit;
228: flying object communication unit;
230: flying object identification unit;
240: connection target determination unit;
250: allocation example;
300, 302, 304: coverage area;
1200: computer;
1210: host controller;
1212: CPU;
1214: RAM;
1216: graphics controller;
1218: display device;
1220: input/output controller;
1222: communication interface;
1224: storage device;
1230: ROM;
1240: input/output chip

What is claimed is:

1. A system, comprising:
a plurality of flying objects having a relaying function configured to relay communication between a gateway on a ground, and a user terminal within a cell formed by wirelessly connecting with the gateway and irradiating a beam toward a ground,
wherein each flying object of the plurality of flying objects includes,
a beacon signal transmission unit for wirelessly transmitting a beacon signal including rank information representing that the flying object is at a first rank when wirelessly connected with the gateway, the rank information representing that the flying object is at a second rank lower than the first rank when wirelessly connected with another flying object being at the first rank, and the rank information representing that the flying object is at a third rank lower than the second rank when wirelessly connected with another flying object being at the second rank,
a radio wave strength measurement unit for measuring strength of a radio wave received from each of the plurality of flying objects,
a flying object identification unit for identifying, when wirelessly connected with any flying object among the plurality of flying objects, a plurality of flying objects from which the strength of the radio wave received is stronger than a predetermined threshold, and
a connection target determination unit for determining a flying object with which wireless connection is to be performed, from the plurality of flying objects identified by the flying object identification unit and based on the strength of the radio wave received from the each of the plurality of flying objects and a rank of the each of the plurality of flying objects.

2. The system according to claim 1, wherein the connection target determination unit is configured to determine, when there is one flying object having the highest rank among the plurality of flying objects identified by the flying object identification unit, the flying object having the highest rank as a flying object with which wireless connection is to be performed.

3. The system according to claim 1, wherein the connection target determination unit is configured to determine, when there is more than one flying object having the highest rank among the plurality of flying objects identified by the flying object identification unit, a flying object from which strength of a radio wave received is the strongest among the plurality of flying objects having the highest rank as a flying object with which wireless connection is to be performed.

4. The system according to claim 2, wherein the connection target determination unit is configured to determine, when there is more than one flying object having the highest rank among the plurality of flying objects identified by the flying object identification unit, a flying object from which strength of a radio wave received is the strongest among the plurality of flying objects having the highest rank as a flying object with which wireless connection is to be performed.

5. The system according to claim 1, wherein the connection target determination unit is configured to determine, when the plurality of flying objects identified by the flying object identification unit has a same rank, a flying object from which strength of a radio wave received is the strongest among the plurality of flying objects as a flying object with which wireless connection is to be performed.

6. The system according to claim 2, wherein the connection target determination unit is configured to determine, when the plurality of flying objects identified by the flying object identification unit has a same rank, a flying object from which strength of a radio wave received is the strongest among the plurality of flying objects as a flying object with which wireless connection is to be performed.

7. The system according to claim 3, wherein the connection target determination unit is configured to determine, when the plurality of flying objects identified by the flying object identification unit has a same rank, a flying object from which strength of a radio wave received is the strongest among the plurality of flying objects as a flying object with which wireless connection is to be performed.

8. The system according to claim 1, wherein among the plurality of flying objects,
a flying object being at the first rank is configured to wirelessly connect with the gateway,
a plurality of flying objects being at the second rank is configured to fly in each of a plurality of second flight areas arranged so as to surround a first flight area for the flying object being at the first rank, and wirelessly connect with the flying object being at the first rank, and
a plurality of flying objects being at the third rank is configured to fly in each of a plurality of third flight areas arranged outside the plurality of second flight areas so as to surround the first flight area, and wirelessly connect with a flying object being at the second rank.

9. The system according to claim 2, wherein among the plurality of flying objects,
a flying object being at the first rank is configured to wirelessly connect with the gateway,
a plurality of flying objects being at the second rank is configured to fly in each of a plurality of second flight areas arranged so as to surround a first flight area for the flying object being at the first rank, and wirelessly connect with the flying object being at the first rank, and
a plurality of flying objects being at the third rank is configured to fly in each of a plurality of third flight areas arranged outside the plurality of second flight areas so as to surround the first flight area, and wirelessly connect with a flying object being at the second rank.

10. The system according to claim 3, wherein among the plurality of flying objects,
a flying object being at the first rank is configured to wirelessly connect with the gateway,
a plurality of flying objects being at the second rank is configured to fly in each of a plurality of second flight areas arranged so as to surround a first flight area for the flying object being at the first rank, and wirelessly connect with the flying object being at the first rank, and
a plurality of flying objects being at the third rank is configured to fly in each of a plurality of third flight areas arranged outside the plurality of second flight areas so as to surround the first flight area, and wirelessly connect with a flying object being at the second rank.

11. The system according to claim 8, wherein
each of the plurality of flying objects being at the second rank forms each second cell of a plurality of second cells arranged so as to surround a first cell on a ground formed by the flying object being at the first rank, and
each of the plurality of flying objects being at the third rank forms each of a plurality of third cells arranged outside the plurality of second cells so as to surround the first cell.

12. The system according to claim 11, wherein when one flying object among the plurality of flying objects being at the second rank stops forming the second cell, the flying object being at the third rank which had been wirelessly connected to the one flying object replaces the one flying object, and then starts transmitting a beacon signal including the rank information representing that the flying object is at the second rank.

13. A control apparatus mounted on a flying object for providing a wireless communication service to a user terminal within a cell formed by irradiating a beam toward a ground, and configured to control the flying object, comprising:
a beacon signal transmission unit for wirelessly transmitting a beacon signal including rank information representing that the flying object is at a first rank when wirelessly connected with a gateway on a ground, the rank information representing that the flying object is at a second rank lower than the first rank when wirelessly connected with another flying object being at the first rank, and the rank information representing that the flying object is at a third rank lower than the second rank when wirelessly connected with another flying object being at the second rank;
a radio wave strength measurement unit for measuring, when wirelessly connected with any of a plurality of flying objects, strength of a radio wave received from each of the plurality of flying objects;

a flying object identification unit for identifying a plurality of flying objects from which the strength of the radio wave received is more than a predetermined threshold; and a connection target determination unit for determining a flying object with which wireless connection is to be performed, from the plurality of flying objects identified by the flying object identification unit and based on strength of a radio wave received from each of the plurality of flying objects and a rank of the each of the plurality of flying objects.

14. The control apparatus according to claim 13, wherein the connection target determination unit is configured to determine, when there is one flying object having the highest rank among the plurality of flying objects identified by the flying object identification unit, the flying object having the highest rank as a flying object with which wireless connection is to be performed.

15. The control apparatus according to claim 13, wherein the connection target determination unit is configured to determine, when there is more than one flying object having the highest rank among the plurality of flying objects identified by the flying object identification unit, a flying object from which strength of a received radio wave is the strongest among the plurality of flying objects having the highest rank as a flying object with which wireless connection is to be performed.

16. The control apparatus according to claim 14, wherein the connection target determination unit is configured to determine, when there is more than one flying object having the highest rank among the plurality of flying objects identified by the flying object identification unit, a flying object from which strength of a received radio wave is the strongest among the plurality of flying objects having the highest rank as a flying object with which wireless connection is to be performed.

17. The control apparatus according to claim 13, wherein the connection target determination unit is configured to determine, when the plurality of flying objects identified by the flying object identification unit has a same rank, a flying object from which strength of a received radio wave is the strongest among the plurality of flying objects as a flying object with which wireless connection is to be performed.

18. The control apparatus according to claim 14, wherein the connection target determination unit is configured to determine, when the plurality of flying objects identified by the flying object identification unit has a same rank, a flying object from which strength of a received radio wave is the strongest among the plurality of flying objects as a flying object with which wireless connection is to be performed.

19. A non-transitory computer readable storage medium having stored thereon a program that causes a computer to function as a control apparatus mounted on a flying object for providing a wireless communication service to a user terminal within a cell formed by irradiating a beam toward a ground, and configured to control the flying object, comprising:

a beacon signal transmission unit for wirelessly transmitting a beacon signal including rank information representing that the flying object is at a first rank when wirelessly connected with a gateway on a ground, the rank information representing that the flying object is at a second rank lower than the first rank when wirelessly connected with another flying object being at the first rank, and the rank information representing that the flying object is at a third rank lower than the second rank when wirelessly connected with another flying object being at the second rank;

a radio wave strength measurement unit for measuring, when wirelessly connected with any of a plurality of flying objects, strength of a radio wave received from each of the plurality of flying objects;

a flying object identification unit for identifying a plurality of flying objects from which the strength of the radio wave received is more than a predetermined threshold; and a connection target determination unit for determining a flying object with which wireless connection is to be performed, from the plurality of flying objects identified by the flying object identification unit and based on strength of a radio wave received from each of the plurality of flying objects and a rank of the each of the plurality of flying objects.

20. A control method to be executed by a control apparatus mounted on a flying object for providing a wireless communication service to a user terminal within a cell formed by irradiating a beam toward a ground, and configured to control the flying object, comprising:

wirelessly transmitting a beacon signal including rank information representing that the flying object is at a first rank when wirelessly connected with a gateway on a ground, the rank information representing that the flying object is at a second rank lower than the first rank when wirelessly connected with another flying object being at the first rank, and the rank information representing that the flying object is at a third rank lower than the second rank when wirelessly connected with another flying object being at the second rank;

measuring, when wirelessly connected with any of a plurality of flying objects, strength of a radio wave received from each of the plurality of flying objects;

identifying a plurality of flying objects from which the strength of the radio wave received is stronger than a predetermined threshold; and determining a connection target by determining a flying object with which wireless connection is to be performed, from the plurality of flying objects identified in the identifying the plurality of flying objects, and based on strength of a radio wave received from each of the plurality of flying objects and a rank of the each of the plurality of flying objects.

* * * * *